H. W. NIEMAN.
CALCULATOR.
APPLICATION FILED APR. 11, 1918.
1,330,132.
Patented Feb. 10, 1920.
2 SHEETS—SHEET 1.
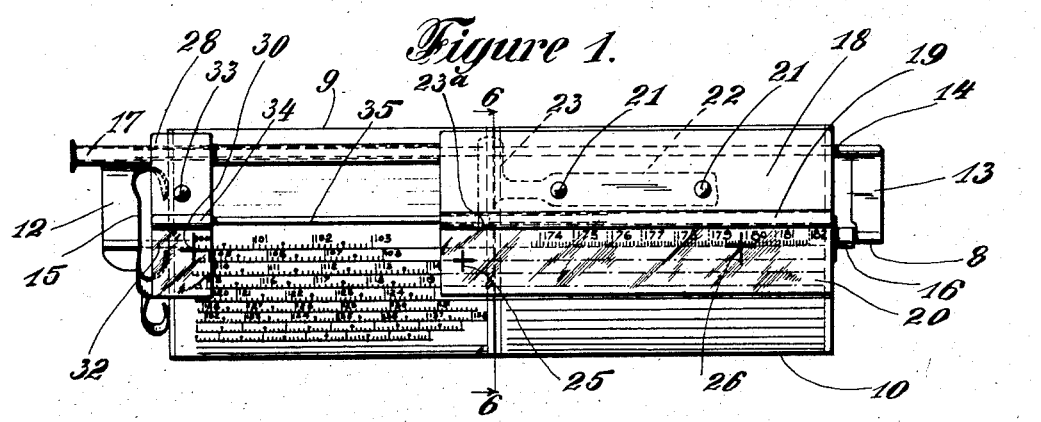
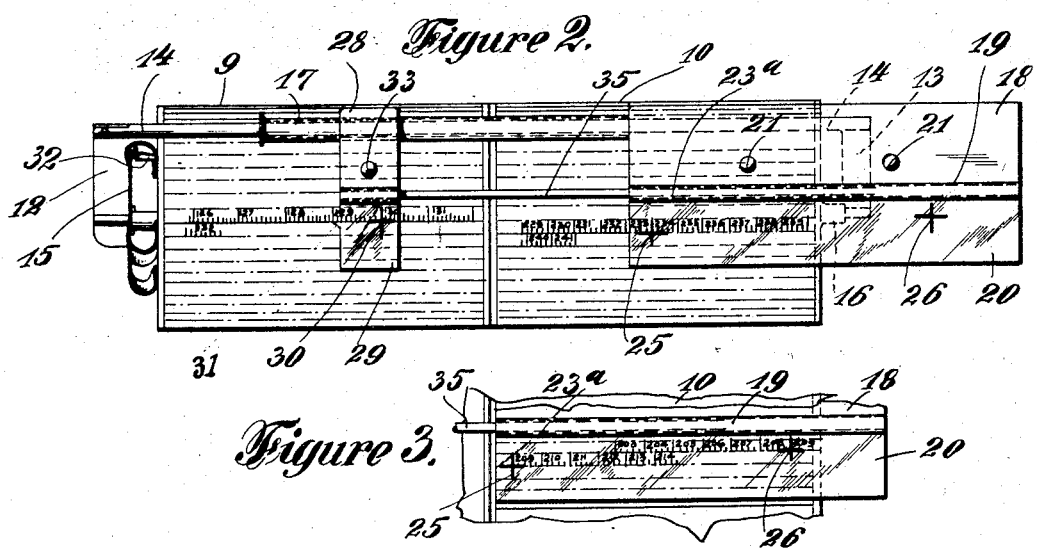
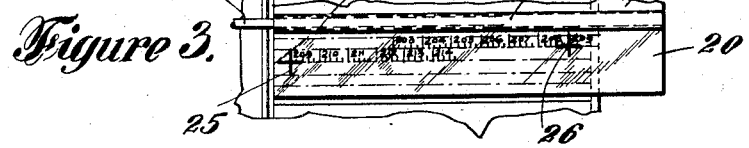
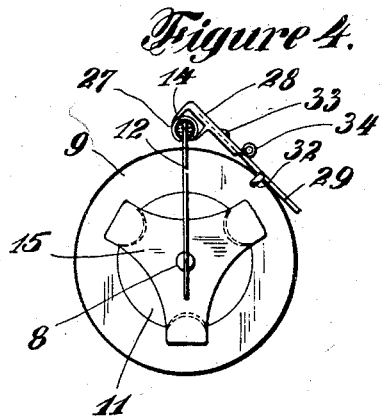
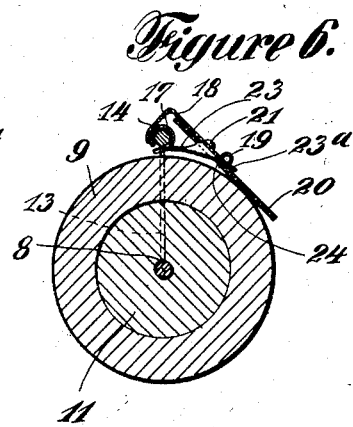
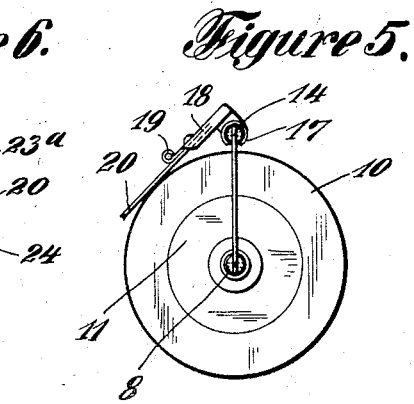
INVENTOR.
Henry William Nieman
BY
Walton Harrison
his ATTORNEY

UNITED STATES PATENT OFFICE.

HENRY WILLIAM NIEMAN, OF NEW YORK, N. Y.

CALCULATOR.

1,330,132.　　　　Specification of Letters Patent.　　Patented Feb. 10, 1920.

Application filed April 11, 1918.　Serial No. 227,904.

*To all whom it may concern:*

Be it known that I, HENRY WILLIAM NIEMAN, a citizen of the United States, residing in the city of New York, in the county and State of New York, have invented certain new and useful Improvements in Calculators, of which the following is a full, clear, and exact description.

My invention relates to calculators of the type admitting of compact construction so as to be readily carried in the pocket of the operator, and having to some extent the principles of the slide rule, yet capable of handling numbers within wide ranges, and singularly adapted for accuracy.

As is well understood in this art, calculators utilizing the principles of the slide rule are well adapted for simple calculations, and particularly multiplication and division. In such calculators there are usually two scales each provided with graduations which are made progressively shorter from one end of the scale to the other, the scales being movable bodily in relation to each other. By such an arrangement one scale may at the will of the operator be so displaced relatively to the other as to virtually add a predetermined distance along one scale to a predetermined distance along the other scale, so that the aggregate distance thus found may be read off upon one of the scales; and in consequence of the successive shortening of the graduations above mentioned the reading may be interpreted in terms of multiplication or division, instead of in terms of addition or subtraction.

In a calculator of this type the greater the actual length of the scale, the more closely it can be divided into graduations, and consequently the more accurate are the readings. With a straight slide rule of ordinary form the length of each scale may be ten inches, and all members except one upon it may be expressed in three figures—the single exception noted being expressed in four figures. The accuracy of such a calculator, while sufficient for many kinds of work, is by no means adequate for mathematical work requiring great refinement. It stands to reason that the practical uses for a calculator may be increased if the instrument be so constructed and arranged that its accuracy be improved.

To increase the accuracy of the old style slide rule its size may be increased but this renders it unwieldy, while with my device the accuracy is increased without the device becoming too large to be carried in the pocket.

Reference is to be made to the accompanying drawing forming a part of this specification and in which like letters indicate like parts in all of the figures.

Figure 1 is a front elevation of my improved calculator, as it appears during certain steps of a calculation.

Fig. 2 is also a front elevation of the device, but showing it as it appears during other steps of the calculation.

Fig. 3 is a detail, being a fragmentary elevation of one of the reading plates, and indicates the use of reading marks carried thereby.

Fig. 4 is an end elevation of the calculator.

Fig. 5 is another end elevation of the device, but shows the opposite end from the one appearing in Fig. 4.

Fig. 6 is a section on the line 6—6 of Fig. 1, looking in the direction indicated by the arrows.

Figure 7:
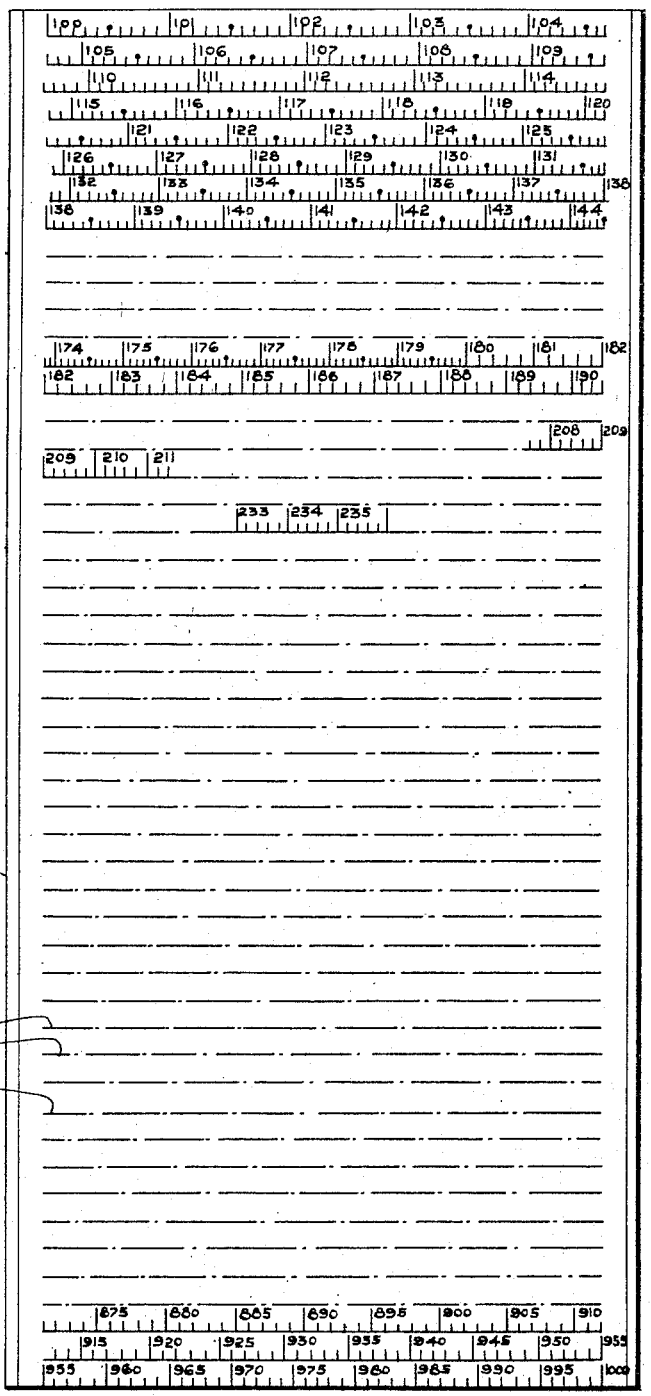
Fig. 7 is a plane development of one of the calculating rollers, of which there are two.

Revolubly mounted upon an axis rod 8 are two calculating rollers 9, 10. In practice, these calculating rollers may be hollow cylinders, each provided with end pieces 11, through which the axis rod 8 extends.

Secured rigidly to the ends of the axis rod 8, and extending radially therefrom, are a pair of supporting rods 12, 13. A bail rod 14, having a length greater than the aggregate length of the two calculating rollers, is secured rigidly to the outer or free ends of the supporting rods 12, 13, and together the supporting rods 12, 13, and together therewith constitutes a bail, which may be swung bodily around the general axis of the calculating rollers.

A friction spider 15, secured to the supporting bar 12, is made of sheet spring metal, and of such form as to press against the adjacent end of the calculating roller 9. The axis rod 8 carries a collar 16, fitting against the supporting rod 13 and serving as a limiting stop to prevent the calculating rollers from moving endwise. The friction spider, by its pressure against the calculating roller 12, thus prevents the two calculating rollers from turning too easily each in relation to the other, and also prevents the bail rod 14 from moving with excessive freedom around the common axis of the calculating rollers. The parts are so arranged that the operator can turn either calculating roller relatively to the other and to the bail, or can turn the bail bodily around relatively to the two calculating rollers considered as a unit.

A sliding tube 17, which is simply a split tube of sheet metal is fitted upon the bail rod 14 and is adapted to be moved endwise relatively to the length thereof. This sliding tube has a length approximately equal to that of the bail rod. Secured rigidly upon the sliding tube 17 and extending throughout a little more than one-half the length thereof is a metal plate 18, provided with a portion 19 curled so as to form a slideway of substantially tubular form. A reading plate 20, made of transparent material, preferably celluloid or sheet horn, is secured rigidly upon the under side of the metal plate 18, and is held in place by rivets 21 and an anchor plate 22. This anchor plate carries a friction tongue 23, which presses gently against the under side of the bail rod 14, thus preventing undue freedom of movement between the bail rod and the sliding tube 17. One end 23ª of the friction tongue 23 extends through a hole 24 in the reading plate 20, and is thus held in place more securely, besides serving another purpose stated below.

The reading plate 20 is provided with two reading marks 25, 26, each being merely a cross, cut in the face of the plate, and used in making observations.

Slidably fitted upon the sliding tube 17 is a shoe 27, carrying a metal plate 28, and therewith slidable along the sliding tube. The metal plate 28 carries a reading plate 29, made of celluloid, horn or other transparent material, and provided with a reading mark 30, which is merely a cross. The use of this reading mark, and the reading marks 25, 26, above mentioned, is described below. The reading plate 29 carries a detent 31, integral with it and serving as a pointer. The detent 31 may be lodged against a pin 32 which has a substantially L-shape and is carried by the calculating roller 9. The pin 32 serves the purpose of a stop against which the detent 31 may be lodged, in order that the reading mark 30 may be held in an exact predetermined position relatively to the calculating roller 9. The reading plate 29 is held upon the metal plate 28 by a rivet 33, and is provided with a portion 34 curled to form a collar. A sliding rod 35 extends into this sleeve and is held rigidly thereby. The sliding rod 35 extends into the tubular slideway 19, carried by the metal plate 18. This slideway serves as a guide for the sliding rod 35 and the various parts movable therewith, including the reading plate 29. The portion 23ª of the friction tongue 23 presses gently against the sliding rod 35, and thus prevents undue freedom of movement between the reading plates 20 and 29.

The operator can move both of the reading plates 20 and 29, as a single unit, relatively to the calculating rollers. That is to say, he can move the reading plates bodily, without disturbing their distance apart or their positions relatively to each other. To do this, he merely grasps the reading plate 20 or the metal plate 18, and using the same as a handle he pushes it to the right or left according to Figs. 1 and 2. It carries with it the sliding tube 17, which in turn carries the metal plate 28 and the reading plate 29, as well as the sliding rod 35.

In order to maintain the two reading plates 20 and 29 in a fixed position relatively to each other and yet to move them bodily as a unit around the calculating rollers, the operator grasps the reading plate 20 or some part closely associated therewith, and using the same as a handle he swings the bail around the calculating rollers, upon the axis thereof as an axis of rotation.

In order to move the reading plate 20 to the right or left according to Figs. 1 and 2 but without disturbing the position of the reading plate 29 relatively to the calculating roller 9, the operator places his thumb upon the reading plate 29, binding it down upon the calculating roller 9. He then grasps the reading plate 20 and pushes it to the right or left. The sliding tube 17 and metal plate 18 move with the reading plate 20, but the metal plate 28 and the sliding rod 35 remain fixed.

In order to move the reading plate 29 to the right or left according to Figs. 1 and 2 but without disturbing the reading plate 20, the operator places his thumb on the reading plate 20, presses it hard against the calculating roller 10, then grasps the reading plate 29 and moves it into the desired position.

The calculating rollers may be turned each relatively to the other or to the reading plates, this step being too obvious to require description.

It will thus be noted that the reading plates are each slidable relatively to the other and to the calculating rollers, in a direction parallel to the common axis of the rollers, and that the rollers are revoluble relatively to each other and to the reading plates.

As the two calculating rollers 9, 10 are exactly alike I will describe only one of them, namely the one numbered 9, and of which a plane development is shown in Fig. 7. This calculating roller is provided with fifty lines 36, spaced equidistant and disposed parallel to each other and extending lengthwise of the roller. These lines are provided with graduations and with numbers defining said graduations, the numbers beginning with 100 and ending with 1000. The graduations and numbers appertaining thereto are so arranged as to constitute collectively a single scale of great length—say a hundred inches. That is to say, if the lines 36 were placed end to end so as to form a single line, this line might readily have a length of a hundred inches, and in such event each line 36 would be two inches long. Beginning at one end of this scale, or in other words beginning at the number 100 shown in the upper left hand corner of Fig. 7, and ending at the opposite end of the scale, that is, with the number 1000 in the lower right hand corner of the figure, the graduations actually or constructively decrease in length, and when they become too short for convenient observation they are made longer and treated as multiples of the shorter graduations, as is customary in slide rules of various kinds.

In instances where the apparatus is designed for operations other than simple multiplication and division, the graduations and numerals printed on the two rollers may be different, but they may be otherwise alike.

My reason for providing the reading plate 20 with the two distinct reading marks 25, 26, instead of with a single reading mark, is based merely upon convenience and a consequent saving of time. Suppose, for instance, that the reading plate 20 is in the position indicated in Fig. 1, so that the reading mark 26 rests upon the graduation corresponding to the number 180. It may so happen, however, that the operator may want to read off a number just a trifle greater than this. He moves the reading plate to the right according to Fig. 1, but as soon as the reading mark 26 passes the end of the line to which it refers, it moves off the calculating roller entirely. The instant this happens, however, the reading mark 25 moves on to the calculating roller, and that, too, at the beginning of the next line below. In other words, the reading mark 25 virtually continues the work of the reading mark 26. The separate functions performed by the two reading marks are cumulative—the practical effect being the same as if the reading plate carries a single mark, and was so handled as to follow any line 36 out to the end of the calculating roller, and then begin at the beginning of the next successive line. This may be understood by a careful study of Fig. 3.

The operation of my device is as follows:

Suppose, for example, the operator desires to multiply the number 18 by the number 13. He first mentally determines what two numbers, carried by the calculating rollers are the ones to be used for purposes of the calculation. Owing to the system of graduation here employed, he notes that the numbers available upon the calculating rollers are not 18 and 13, but 180 and 130, and he ascertains them by merely ignoring, for the moment, the presence of the final ciphers, as is commonly done in slide rule work. The operator now moves the reading plate 29 into such position that the reading mark 30 registers with the graduation designated 100—that is, indicates the initial point, or practical beginning, of the scale. The operator can effect this movement conveniently, if he so chooses, by merely bringing the reading plate 29 into such position that the detent 31 registers with the pin 32, as indicated in Fig. 1.

The operator next places his thumb upon the reading plate 28, and presses this plate firmly against the adjacent surface of the calculating roller 9, so as to prevent the reading plate from moving relatively to this calculating roller. In doing this he also prevents the other reading plate 20 from swinging or turning bodily upon the common axis of the calculating rollers, but leaves this last mentioned plate free to be moved endwise, that is in a direction parallel to the common axis. It also leaves the calculating roller 10 free. The operator, by turning the calculating roller 10, and moving the reading plate 20 in a direction parallel to the axis of rotation, now brings the reading mark 26 into registry with the graduation designated by the number 180, above mentioned. This done, the operator removes his thumb from the reading plate 29. The two reading plates 20 and 29, owing to their mechanical connections above described, may now as a unit be swung bodily around the axis of rotation common to the two calculating rollers, and may also as a unit be moved lengthwise or parallel to the common axis of the rollers. The operator thus accordingly moves the reading plates, without disturbing them relatively to each other, or what is practically the same thing, he holds them still and turns the two calculating rollers, as a unit, relatively to them. By so doing he brings the reading mark 30 into registry with the graduation indicated by the number 130, above mentioned. The operator finally directs his attention to the reading plate 20, and ascertains the position of the reading mark 26 or 25, as the case may be, whichever of these reading marks happens to be adjacent the calculating roller 10. In the instance now under discussion he sees that the reading mark 26 is off the scale, but that the reading mark 25 refers to the number 234, which is the result desired.

Problems in division are solved in a manner closely associated with those of multiplication. Suppose that we wish to divide the number 234 by the number 13. We bring the reading mark 25 into register with the graduation corresponding to the number 130

234, and holding the reading plate 20 in fixed relation to the calculating roller 10 we turn the calculating roller 9 and adjust the reading plate 29 until the reading mark 30 indicates the graduation numbered 130— that is, indicates the number which is used to represent the division 13. This done, the calculating rollers are operated as a unit, and the reading plates 29 and 20 are operated also as a different unit, and so shifted relatively to the calculating rollers that the reading mark 30 is brought into the initial position indicated in Fig. 1. It will now be noted that the reading mark 26 refers to the number 180, and thus suggests the answer, which is the number 18.

Other calculations than multiplication and division can be made with my device, the principles being largely the same as those used in slide rule work.

It will be noted that no matter what mathematical operation is to be performed, no confusion can possibly result from the use of the two reading marks 25 and 26. It may sometimes happen, as shown in this figure, that both reading marks 25 and 26 are readable upon the scale at the same time, but in such event they each make the same reading. In all other instances the reading marks 25 and 26 are necessarily used one at a time. Thus the operator is always safe in accepting a reading indicated by either of the two marks.

A feature of my invention is the singular compactness attained by the arrangement of a very long scale into lines above designated as 36, and so grouping these lines that they severally extend at right angles to the line of cleavage separating the calculating rollers, or their equivalent from each other.

What I claim and desire to secure by United States Letters Patent is:—

1. In a calculator the combination of a pair of surfaces movable relatively to each other and each provided with graduations, the graduations of each surface being in rows extending crosswise of the direction of movement of said surfaces, a pair of separate reading plates, one for each surface and provided with a reading mark for selectively pointing out the graduations thereof, each reading plate being adjustable by hand in a direction lengthwise of said rows, and mechanism connected with both of said reading plates for enabling them as a whole to be shifted bodily in relation to the respective surfaces with which they are associated.

2. In a calculator the combination of a pair of surfaces movable relatively to each other and each provided with graduations, the graduations of each surface being in rows each extending crosswise of the direction of movement of said surfaces relatively to each other, the several rows of graduations carried by each surface collectively constituting a single scale, a reading plate associated with each surface and provided with a reading mark for selectively pointing out the graduations thereof, each reading plate being adjustable relatively to the surface with which it is associated, in a direction coinciding with the length of the rows of graduations carried thereby, so that each reading plate may be adjusted without adjusting the other reading plate, and mechanism connected to both of said reading plates and controllable at the will of the operator for shifting said reading plates, bodily as a unit, in a direction crossing the length of said rows of graduations.

3. In a calculator the combination of a pair of surfaces movable relatively to each other and each provided with graduations, the graduations of each surface being in rows each extending crosswise of the direction of movement of said surfaces relatively to each other, the several rows of each surface being cumulative and collectively constituting a logarithmic scale of great virtual length, a reading plate associated with each surface and provided with a reading mark for selectively pointing out graduations thereof, the reading plates being adjustable independently of each other in the common direction in which all of the rows of graduations extend, and mechanism connected to both of said reading plates and controllable at the will of the operator for shifting said reading plates bodily as a unit in a direction crossing the length of said rows of graduations.

4. In a calculator the combination of a pair of calculating rollers having a common axis upon which they are revoluble relatively to each other, each of said calculating rollers being provided with graduations arranged in rows each extending parallel to said common axis, the several rows upon each roller being cumulative and together constituting a logarithmic scale of great virtual length, a reading plate associated with each calculating roller and provided with a reading mark for selectively pointing out graduations thereof, the reading plates being adjustable independently of each other in the direction of the length of the rows, and mechanism connected to both of said reading plates and controllable at the will of the operator for shifting said reading plates bodily as a unit in a direction crossing the length of said rows of graduations.

5. In a calculator the combination of a surface provided with a logarithmic scale divided into rows disposed parallel to each other, said rows being arranged cumulatively so that the end of one row is equivalent to the beginning of another row, and a reading plate associated with said surface and movable relatively thereto in a direction coinciding with the length of said rows and also in a direction crossing said rows, said reading plate being provided with a pair of reading marks, said reading marks being spaced apart in a direction coinciding with the length of the rows by a distance equal to the length of a row, and spaced apart in a direction crossing the length of the row by a distance equal to the distance from one row to the next successive row.

6. In a calculator the combination of a pair of calculating surfaces adjustable relatively to each other and each provided with a logarithmic scale divided into rows disposed parallel to each other, the rows of each calculating surface being cumulative so that the beginning of one row is for purposes of calculation the equivalent of the end of another row, a reading plate provided with a reading mark for selectively indicating portions of the rows of one of said calculating surfaces, a second reading plate associated with the other of said calculating surfaces, said second mentioned reading plate having two distinct reading marks spaced apart by a fixed distance in one direction equal to the exact length of a row, and in another direction equal to the exact distance apart of two adjacent rows, each of said reading plates being adjustable independently of the other in relation to the length of the rows, and both of said reading plates as a unit being movable bodily in a direction crossing the length of said rows.

HENRY WILLIAM NIEMAN.

Witnessed by—
 SIN PONG HUI,
 REE WON CHANG.